Patented July 28, 1931

1,816,339

UNITED STATES PATENT OFFICE

SIDNEY MUSHER, OF BALTIMORE, MARYLAND

FOOD PRODUCT

No Drawing.   Application filed February 16, 1929. Serial No. 340,656.

This invention relates generally to food products and more particularly to a product capable of producing the same physiological reactions and having the same qualities of assimilation as human breast-milk.

Pediatricians recognize the fact that fat intolerance among children is very prevalent and that it is particularly due to the fact that the fatty make-up of cow's milk does not lend itself to proper assimilation and digestion in the delicate organs of the infant. This same fact applies to elderly people who either are not physically constituted to assimilate this type of fat or who are ill and must be given forms of nutrition which they can readily assimilate.

The following matter explains the difference between the fat of human breast-milk, the most complete single food known, and the fat of cow's milk.

The fatty constituents of cow's milk consists of approximately 32% olein, 2% stearin, 35% palmitin, and 31% of the glycerides of lower fatty acids. These lower glycerides, or volatile fats, are not well assimilated by the system, and, moveover, are the fats which are most likely to cause rancidity, due to the fact that they oxidize far more readily than any of the other known fats.

The fat of human breast-milk, on the other hand, is composed of the following:

| Glycerides of— | Per cent |
|---|---|
| Stearic acid | 4.9 to 6.3 |
| Palmitic acid | 16.9 to 21.1 |
| Oleic acid | 65.6 to 86.7 | with a negligible percentage of the glycerides of lower fatty acids.

Thus cow's milk differs materially from human breast-milk and can not be substituted therefor in all cases.

Many attempts have been made to modify cow's milk to resemble human breast-milk from the standpoint of its chemical properties such as the iodine number, saponification number, refractive index, etc., of the fat, rather than of its chemical constituents, but it has been found that this method does not produce a product that is physiologically assimilable in the manner of human breast-milk; and obviously without this latter essential condition, the attempts must be considered unsuccessful. While it is a very simple process to manipulate chemical constituents of various types of fats in order to produce products of identical chemical properties, they are not necessarily capable of producing the same physiological reactions. It is recognized that fat alone even tho desirable from the standpoint of chemical properties is not necessarily well assimilated.

I have found that a proper mixture of olive oil and skimmed milk, which altho not identical in chemical composition with human breast-milk, yet has a degree of assimilation quite similar to such milk. The olive oil which may be obtained in its virgin state is capable of quick assimilation and is hence quite desirable from a physiological viewpoint. Furthermore, its fatty constituents tally more closely with the fat of human breast-milk than any other known vegetable or animal fat. Its relative composition, within slight variations, is as follows:

| Glycerides of— | Per cent |
|---|---|
| Stearic acid | 3 |
| Palmitic acid | 19 |
| Oleic acid | 78 |

An object of the invention is to produce a food compound closely resembling human breast-milk.

A further object is to produce a food product which is capable of producing the same physiological reactions as human breast-milk.

A further object is to produce a food product readily assimilable in the human system.

A still further object is to produce a food compound which has in its fatty constituency those lipolytic enzymes or lipases which aid in its proper digestion and assimilation in the human system.

Other objects will appear in the following description:

I mix skimmed milk with olive oil so as to produce a total fat content not exceeding the fat content of normal human breast-milk, which is usually about 3.59%. This is accomplished by mixing about 3.29% oilve oil with 96.71% skimmed cow's milk, which latter has present about .3% fat.

Homogenization should not be resorted to in mixing the olive oil with the skimmed milk, because in a process of beating air into the compound there is a distinct loss in vitamin activity and a deteriorating effect upon the oil due to oxidation. The best means of properly mixing the two is by grinding the particles as in a colloid mill.

Upon emulsification of the olive oil with the skimmed milk, the resultant product may be sprayed and thereby put into better form. It has been found that the olive oil would then have better keeping qualities than olive oil alone. This is due to the fact that the other protein and sugar constituents surround the particles of fat and protect them from oxidation. Milk itself, being an oil-in-water emulsion, upon drying surrounds the oil and keeps it away from air and consequent oxidation.

It is desirable in certain instances to add glycero-phosphates or lacto-albumins, depending upon the particular need. In every instance, however, I use skimmed milk and render normal the fat content with olive oil.

In order to increase the lecithin, phosphatide and vitamin D content, such substances as egg yolk, powdered egg-yolk or egg-yolk oil may be added in small percentages. The product may likewise be mixed with a small percentage of cod-liver oil in order to give it a high antirachitic vitamin content as well as effect an increase in the calcium metabolism.

It is to be understood that the invention is not restricted to the use of skimmed milk, since I may substitute powdered milk wherever a basic compound containing the proteid structure is desired in addition to fat similar to human breast-milk. This compound may be made into condensed milks, evaporated milks, and similar products.

In order to render the product more palatable, a slight amount of chocolate or sugar may be added.

The use of olive oil in preference to other fats is further enhanced by the fact that it may be obtained in its virgin or cold-pressed state wherein the lipolytic or fat-splitting enzymes are present, which enzymes are absent from powdered or pasteurized milk due to their having been rendered inactive by the heat treatment. These enzymes are necessary to effect proper splitting of fat in the intestinal tract and in the subsequent assimilation. One of the chief advantages of human breast-milk is due to the presence therein of those lipolytic enzymes, which are present in the product forming the present invention.

I may refer to my copending application #238,464 filed December 7, 1927, wherein is described a food product produced by mixing oil-bearing crushed seed or nut with milk. If this is followed with skimmed milk and the sun-dried crushed olive, a food product is produced which, aside from being very similar to human breast-milk, has a number of constituents and minerals which are ordinarily lacking in breast milk but which are given by reason of the sun-drying process and by the minerals and sterolic and other substances of the meat of the olive.

There are certain olive oils from certain regions of Italy which are similar to cotton-seed oil in their chemical makeup. In other words, these oils do not resemble the fat of human breast milk. It is therefore to be understood that whenever olive oil is mentioned in the case, it is meant to include only such virgin olive oils resembling the fat of human breast milk in constitution and physiological reactions.

Having described my invention, I claim:

1. A food product comprising an emulsion of skimmed milk and a virgin olive oil containing a normal percentage of lipolytic enzymes, such olive oil being present in an amount not in excess of 3.59%, said product having the same relative percentages of the glycerides of fatty acids as human breast milk.

2. A food product comprising a dry powder emulsion of skimmed milk and virgin olive oil containing its normal percentage of lipolytic enzymes such virgin olive oil being present in an amount not to exceed 3.59% in the original liquid before powdering.

SIDNEY MUSHER.